US009739208B2

(12) United States Patent
Griffiths et al.

(10) Patent No.: US 9,739,208 B2
(45) Date of Patent: Aug. 22, 2017

(54) ENGINE FUEL CONTROL SYSTEM

(71) Applicant: ROLLS-ROYCE CONTROLS AND DATA SERVICES LIMITED, Derby, Derbyshire (GB)

(72) Inventors: Michael Griffiths, Bromsgrove (GB); Roger Southeran, Derby (GB)

(73) Assignee: ROLLS-ROYCE PLC, London (GB)

( * ) Notice: Subject to any disclaimer, the term of this patent is extended or adjusted under 35 U.S.C. 154(b) by 253 days.

(21) Appl. No.: 14/528,409

(22) Filed: Oct. 30, 2014

(65) Prior Publication Data
US 2015/0192073 A1    Jul. 9, 2015

(30) Foreign Application Priority Data

Jan. 6, 2014 (GB) .................................. 1400153.1

(51) Int. Cl.
| | | |
|---|---|---|
| *F02C 1/00* | (2006.01) | |
| *F02C 9/26* | (2006.01) | |
| *F01D 17/10* | (2006.01) | |
| *F02C 7/232* | (2006.01) | |
| *F02C 7/236* | (2006.01) | |

(Continued)

(52) U.S. Cl.
CPC .............. *F02C 9/263* (2013.01); *F01D 17/10* (2013.01); *F02C 7/22* (2013.01); *F02C 7/232* (2013.01); *F02C 7/236* (2013.01); *F02C 9/32* (2013.01); *F05D 2220/32* (2013.01); *F05D 2270/306* (2013.01); *F05D 2270/3015* (2013.01)

(58) Field of Classification Search
CPC .... F02C 9/263; F02C 9/32; F02C 7/22; F02C 7/236; F02C 7/232; F02C 9/26; F02C 7/222; F05D 2270/3015
USPC ............................................................ 60/734
See application file for complete search history.

(56) References Cited

U.S. PATENT DOCUMENTS

| | | | | |
|---|---|---|---|---|
| 3,672,163 A | * | 6/1972 | White ....................... | F02C 7/26 60/39.281 |
| 3,686,860 A | * | 8/1972 | White ....................... | F02C 9/54 60/39.25 |

(Continued)

FOREIGN PATENT DOCUMENTS

| | | |
|---|---|---|
| EP | 1 785 348 A2 | 5/2007 |
| EP | 2 500 551 A2 | 9/2012 |

(Continued)

*Primary Examiner* — Pascal M Bui Pho
*Assistant Examiner* — Edwin Kang
(74) *Attorney, Agent, or Firm* — Oliff PLC

(57) ABSTRACT

An engine fuel control system is provided, including a supply line for the supply of fuel to a fuel metering valve which controls the flow of fuel to burners of an engine. Fuel is delivered at a first high pressure to the supply line by a pump arrangement. The engine fuel control system includes a restrictor located in the supply line for passage of the fuel delivered by the pump arrangement therethrough. The restrictor is configured such that fuel exiting the restrictor for onward supply to the fuel metering valve is at a second high pressure which is lower than the first high pressure. The engine fuel control system includes pressure limiting valves which actuate when the pressure difference between the first high and low pressure reaches a predetermined level to open a flow path for fuel on the supply line to by-pass the restrictor, thereby limiting the pressure difference.

9 Claims, 2 Drawing Sheets

(51) Int. Cl.
    *F02C 7/22*          (2006.01)
    *F02C 9/32*          (2006.01)

(56) References Cited

U.S. PATENT DOCUMENTS

| | | | |
|---|---|---|---|
| 3,727,486 A * | 4/1973 | Vulliamy | B60W 30/18 |
| | | | 477/111 |
| 4,913,110 A | 4/1990 | Melnik et al. | |
| 5,209,058 A * | 5/1993 | Sparks | F02C 7/22 |
| | | | 60/39.281 |
| 5,220,793 A * | 6/1993 | McGlone | F02C 7/22 |
| | | | 415/49 |
| 5,341,635 A | 8/1994 | Kast et al. | |
| 6,176,076 B1 | 1/2001 | Ford | |
| 6,836,086 B1 | 12/2004 | Goldberg et al. | |
| 7,137,242 B2 | 11/2006 | Griffiths | |
| 8,156,742 B2 * | 4/2012 | Brettes | F02C 7/232 |
| | | | 137/110 |
| 2005/0217236 A1 | 10/2005 | Wernberg et al. | |
| 2009/0199813 A1 | 8/2009 | Kuzuyama et al. | |
| 2012/0315152 A1 | 12/2012 | Baker | |

FOREIGN PATENT DOCUMENTS

| | | |
|---|---|---|
| GB | 1 171 371 | 11/1969 |
| GB | 1 228 161 | 4/1971 |
| GB | 2 315 100 A | 1/1998 |
| JP | A-2013-231406 | 11/2013 |

* cited by examiner

ENGINE FUEL CONTROL SYSTEM

FIELD OF THE INVENTION

The present invention relates to an engine fuel control system and in particular to a fuel control system for use in controlling the supply of fuel to a gas turbine engine.

BACKGROUND OF HE INVENTION

Fuel control systems, of the type described in U.S. Pat. No. 7,137,242, are used in controlling the supply of fuel to an aircraft engine. Such systems have a hydro-mechanical unit (HMU) which contains a metering valve and which receives a supply of fuel at high pressure (HP) from a gear pump driven from, and thus operated at a speed related to, the main shaft of the associated gas turbine engine. The inlet of the gear pump is supplied from a fuel reservoir by means of a boost pump or lift pump, the pressure at the inlet of the gear pump being defined as low pressure (LP), which in practice may be above atmospheric pressure but substantially below HP. The supply line from the outlet of the gear pump contains a fuel filter and enters the HMU to provide an HP supply to the inlet gallery of the metering valve and thence to a variable metering orifice of the valve. As is conventional in metering valves, a spool of the valve is moved within the housing of the valve to control the degree of opening of the metering orifice of the valve and thus the metering of fuel flow through the valve. A delivery line from the metering valve conducts metered fuel at a reduced pressure PX through a pressure raising and shut-off valve (PRSOV) of the HMU. The PRSOV serves in use, to maintain a minimum fuel pump pressure rise (HP–LP), so as to ensure that internal HMU valves and any fuel-pressure operated auxiliary devices (such as variable stator vane actuators, variable inlet guide vane actuators and bleed valve actuators) arranged to receive fuel under pressure from the fuel control system can operate correctly. An output line from the PRSOV exits the HMU to pass the metered fuel to the engine burner manifold(s).

The PRSOV typically contains a spring-biased piston, the front face of which is acted on by fuel at the pressure PX, and the rear face of which is acted on by fuel at further reduced pressure PZ. The level of PZ relative to LP is determined by a PRSOV orifice potentiometer arrangement, The pressure differential across the gear pump HP–LP can conveniently be used to operate auxiliary engine devices, such as a variable stator vane (VSV) actuator, a variable inlet guide vane (VIGV) actuator and/or a bleed valve actuator. Each actuator is controlled by its own dedicated servo-valve, the pressure differential available to each servo-valve being HP–LP. This pressure differential is made up of three elements:

$$\text{HP-LP} = (\text{HP}-PX) + (PX-PZ) + (PZ-\text{LP}).$$

At low flow conditions, this is set to a relatively constant value. More particularly, HP–PX, the pressure drop across the metering valve, is generally kept constant e.g. by using a pressure drop control valve (PDCV) and combining spill valve arrangement. PX–PZ, the pressure drop across the PRSOV piston, can be set by the PRSOV spring load and the area of the piston since at low flow conditions the PRSOV piston is active and not at a maximum stop. PZ–LP, the pressure drop across the PRSOV potentiometer return orifice, also generally has a fixed value since the pressure drop across the potentiometer fixed feed orifice (HP–PZ=HP–PX+PX–PZ) is constant setting a fixed flow through both orifices. Thus with typical values at law burner flow conditions of HP–PX=125 psid (0.86 MPa), PX–PZ=70 psid (0.48 MPa), and PZ–LP=245 psid (1.69 MPa), the pressure differential HP–LP available to operate auxiliary engine devices can be about 440 psid (3.03 MPa).

However, the system described above has a number of drawbacks:

It does not separate the HMU and actuator pressure rise requirements. In order to move the actuators at the required velocities against prevailing loads, a high HMU minimum pressure differential HP–LP is needed. This has implications for hydromechanical loop instability, metering valve fail down rates and heat input to the fuel via spill flow from the combining spill valve.

At start conditions (pump speeds around 6-25%), there is a risk to pump bearing integrity. More particularly, operating at a high pressure rise and low speed reduces bearing film thicknesses and can result in excessive pump wear.

At start conditions, the high HP–LP results in high pump/HMU internal leakages back to LP, thereby reducing the amount of pump flow available to start the engine, which can be an issue at low speeds because pump delivery flow is proportional to speed.

With increasing actuator loads on large modern engines, even if the minimum system pressure rise HP–LP is as high as to 440 psid (3.03 MPa), it may still be necessary to introduce larger actuators and servo-valves and this may not be practically possible.

U.S. Pat. No. 6,176,076 proposes providing a passive restrictor in a spill return line to raise the HMU minimum system pressure rise between start and idle. However, to ensure sufficient pressure at all conditions, generally a small restrictor is required. As a result there can then be too high an HMU pressure rise at other spill conditions, resulting in undesirably increased heat input to the fuel, In addition, the arrangement of U.S. Pat. No. 6,176,076 can be sensitive to external actuator off-take flows. For example, when such external actuators are moved, the reduction in spill flow, and hence reduction in minimum system pressure rise available to move the actuators, can be significant.

Thus there is a need to overcome or avoid such drawbacks while ensuring that fuel is supplied at adequate pressures.

SUMMARY OF THE INVENTION

In a first aspect, the present invention provides an engine fuel control system including:

a supply line for the supply of fuel to a fuel metering valve which controls the flow of fuel to burners of an engine, in use the fuel being delivered at a first high pressure (HPa) to the supply line by a pump arrangement:

a restrictor located in the supply line for passage of the fuel delivered by the pump arrangement therethrough, the restrictor being configured such that fuel exiting the restrictor for onward supply to the fuel metering valve is at a second high pressure (HP) which is lower than the first high pressure (HPa); and a pressure limiting valve which is actuated when the pressure difference (HPa–LP) between the first high pressure and the low pressure reaches a predetermined level to open a flow path for fuel on the supply line to by-pass the restrictor, thereby limiting the pressure difference (HPa–LP).

Advantageously, the restrictor allows the fuel supplied to the metering valve to be at a reduced pressure (HP). whilst the pump outlet pressure (HPa) becomes a function of pump delivery flow, and hence of pump speed. This can alleviate pump bearing problems as the pump arrangement can operate at lower pressures at low speeds It can also reduce pump/HMU leakage, and reduce a risk of cavitation in an HMU at low speeds when the restrictor pressure drop is low.

In a second aspect, the present invention provides a gas turbine engine (e.g. an aero-engine) having the engine fuel control system of the first aspect.

Optional features of the invention will now be set out. These are applicable singly or in any combination with any aspect of the invention.

The restrictor may be a fixed restrictor, such as an orifice in the supply line.

The engine fuel control system may further include an off-take line which extends from a junction with the supply line, the off-take line supplying fuel at the first high pressure (HPa) to one or more fuel-pressure operated auxiliary engine devices via one or more control devices, such as servo valves, which may be mounted in an HMU or on the auxiliary engine devices. More particularly, the control devices supplied with fuel at the first high pressure (HPa) can in turn control servo pressures/servo flows applied to the auxiliary engine devices. The auxiliary engine devices can include any kind of actuator, and in particular can include any one or more of: a variable stator vane actuator, a variable inlet guide vane actuator and a bleed valve actuator. Advantageously, the pump unit can thus separate the pressure rise requirements of such external actuators and an HMU. For example, the pressure rise available to move the external actuators can he increased without adversely affecting the HMU. in addition, relative to the arrangement proposed in U.S. Pat. No. 6,176,076, the minimum pressure rise available to move the actuators can be much less sensitive to off-take flows.

The engine fuel control system may further include a filter, such as a flow washed filter, at the junction of the off-take line with the supply line for filtering the fuel supplied through the off-take line.

The engine fuel control system may further include the pump arrangement. One option is for the pump arrangement to be a single pump, such as a single gear pump. According to another option, however, the pump arrangement may comprise a small displacement pump and a large displacement pump, the small displacement pump delivering the fuel at the first high pressure (HPa) to the supply line. The large displacement pump may deliver fuel to the supply line downstream of the restrictor. Such a pump arrangement may be in the form of a dual gear pump. The engine fuel control system may further include a low pressure source, e.g. a low pressure pump such as a boost or lift pump, from which the pump arrangement receives the fuel at a low pressure (LP).

The engine fuel control system may further include a fuel metering valve which controls the flow of fuel to burners of an engine, the fuel metering valve being supplied with fuel by the supply line.

BRIEF DESCRIPTION THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
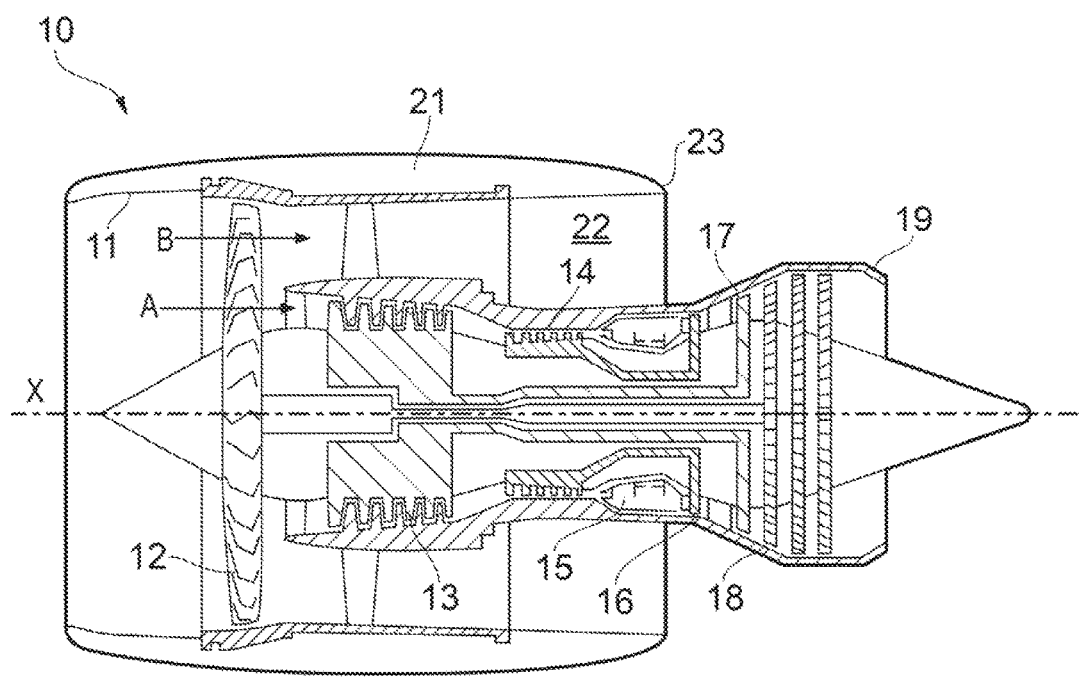
FIG. 1 shows a longitudinal cross-section through a gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed, into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
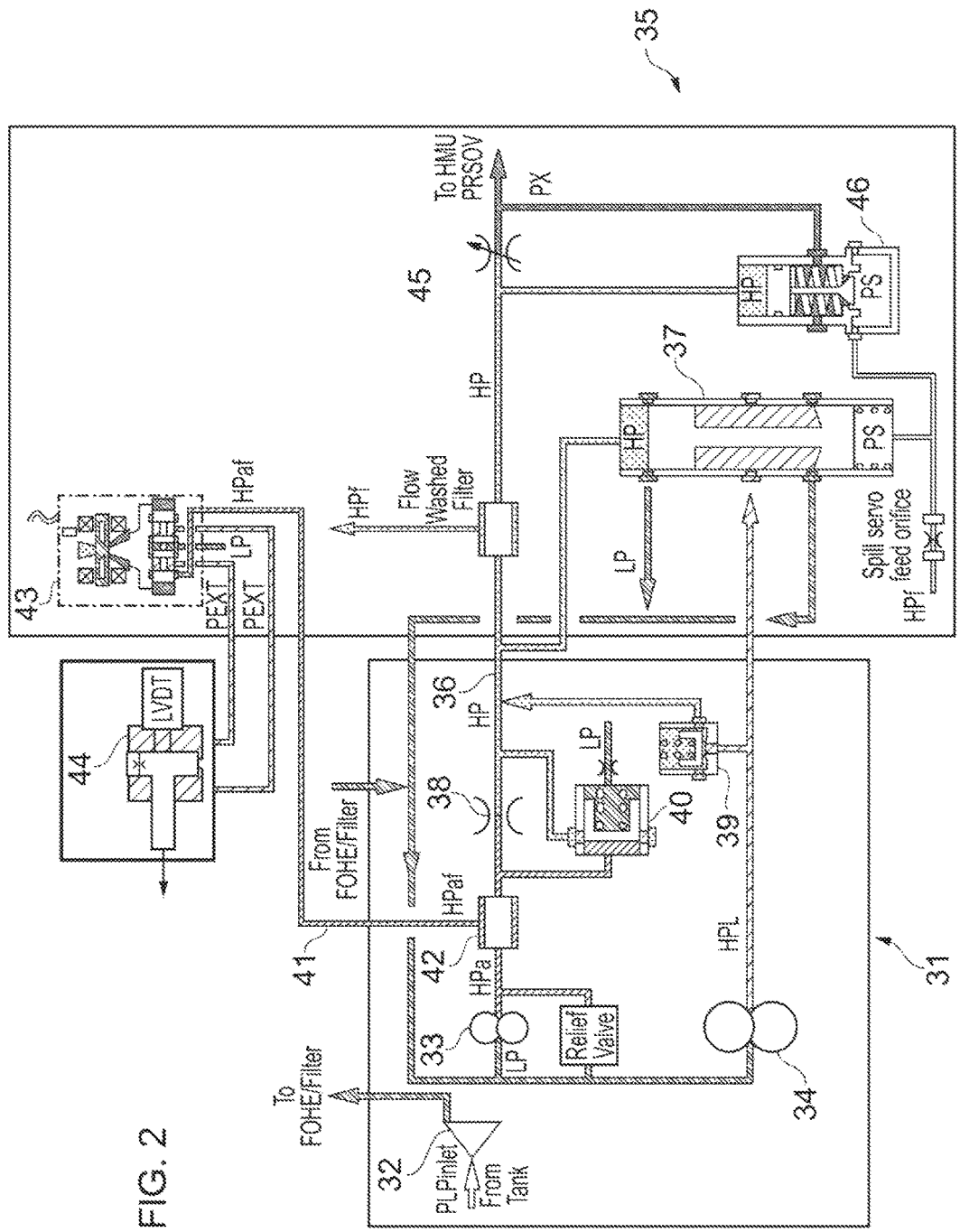
FIG. 2 illustrates schematically part of a fuel control system for the engine of FIG. 1.

A fuel control system of the engine, a part of which is illustrated diagrammatically in FIG. 2, has a pump unit 31 and a hydro-mechanical unit (HMU) 35. The pump unit 31 comprises a low pressure pump 32 which draws fuel from a fuel tank of the aircraft at pressure PLPinlet and supplies the fuel at boosted pressure LP to the inlet of a high pressure pumping arrangement comprising a small displacement pump 33 and a parallel large displacement pump 34. The low pressure pump 32 typically comprises a centrifugal impeller pump while the high pressure pumping arrangement may comprise twin pinion gear pumps.

The low pressure pump 32 and the high pressure pumps 33, 34 are typically connected to a common drive input, which is driven by the engine high-pressure or intermediate-pressure shaft via an engine accessory gearbox, The interstage flow between the low pressure and high pressure pumping stages is typically used to cool engine lubrication oil in a fuel/oil heat exchanger (FOHE—not shown).

Not all the fuel exiting the large displacement high pressure pump 34 (at pressure HPL) may be burnt in the engine. A substantial proportion may be recirculated back to the pump unit 31 via a combining spill valve 37 and a spill return of the HMU 35, For example, when the engine is operating at altitude where the engine burns little fuel, the total large pump delivery flow may be recirculated, but any resulting fuel temperature use is low because the position of the combining spill valve is such that the spill port taking the large pump delivery flow is large so that the large pump pressure rise is small.

Only a part of the HMU 35 of the fuel control system for the engine is illustrated in FIG. 2, The high pressure pumps 33, 34 feed fuel to a supply line 36 which extends to a fuel metering valve 45, the metering valve being operable to control the rate at which fuel is allowed to flow from the supply line 36 via a pressure raising and shut-off valve (PRSOV—not shown) of the HMU to a delivery line and thence to burners of the engine. A constant pressure differential is maintained across the metering valve by the combination of a pressure drop control valve 46 (PDCV) and the combining spill valve 37.

The small displacement high pressure pump 33 has a relief valve which prevents excess pressure build up in the supply line 36 in the event of a downstream blockage e.g. caused by coking of fuel in the engine fuel manifold.

A restrictor 38, in the form of an orifice, is located in the supply line 36. The restrictor sets a higher fuel pressure HPa at delivery of the small displacement high pressure pump 33 than the fuel pressure HP which is supplied by the supply line to the metering valve 45. The part of the fuel from the large displacement high pressure pump 34 which is not recirculated back to the pump unit 31 enters the supply line 36 via a non-return valve 39 and downstream of the restrictor 38.

A pressure limiting valve 40 is provided in parallel to the restrictor 38 and is actuated when the pressure difference (HPa−LP) reaches a predetermined level to open a flow path for fuel on the supply line 36 to by-pass the restrictor 38, thereby limiting the pressure difference (HPa−LP).

An off-take line 41 branches from the supply line 36 upstream of the restrictor 38, a flow-washed filter 42 being located at the junction of the off-take line and the supply line. The off-take line 41 supplies filtered fuel at pressure HPaf to a dual lane servo-valve 43 operating external actuators 44 for the engine variable inlet guide vanes (VIGVs) and variable stator vanes (VSVs).

The restrictor 38 and the pressure limiting valve 40 arrangement together set a higher minimum pump pressure rise (HPa−LP), separate to the HMU 36 pressure rise (HP−LP), for actuation control at engine speeds above idle.

The normal minimum system pressure rise (HP−LP) in the HMU is set by the PDCV 46 spring, the PRSOV spring and the PRSOV orifice potentiometer. However, as the HMU pressure rise is no longer required for operation of the external actuators 44, this can be set to a lower value, e.g. 250 psid (1.72 MPa) compared to a conventional 440 paid (3.03 MPa) discussed earlier.

As mentioned above, the fixed restrictor 38 downstream of the small displacement pump 33 sets a higher pressure HPa at pump delivery. However, since the bulk of the small pump delivery flow passes through the fixed restrictor, the additional pressure rise (HPa−HP) is a function of the pump speed (and hence small pump flow) and the size of the restrictor. The restrictor may be sized so that at an idle type speed (60%), the flow through it provides about an additional 300 psid (2.07 MPa) for actuation control. Thus:

HPa−LP=(HPa−HP)+(HP−LP)=300+250=550 psid (3.79 MPa)

where (HP−LP) is set by the HMU,

At start speeds, the pump delivery falls so HPa−HP falls, giving reduction in the pump pressure rise. For example:

HPa−LP=320 psid (2.21 MPa) at 25% speed, 254 psid (1.75 MPa) at 6% speed

This is beneficial because (i) it reduces pump/HMU leakage at start so that more of the pump delivery flow is made available to the engine and (ii) it reduces the risk of mixed film bearing operation. That is, the pumps are no longer operating at low speed and high pressure.

At idle and above, a minimum HPa−LP pressure rise of 550 paid (3.79 MPa) is available to drive the VIGVs and VSVs via the servo-valve 43. Benefits of this are greater slew capability/force margins of the external actuators 44 and a potential to reduce the sizes of the servo-valve 43 and the external actuators 44.

The pressure limiting valve 40 limits the small displacement pump 33 pressure rise, For example, the piston area and spring of the pressure limiting valve can be sized so that the valve cracks open when the pressure drop across the fixed restrictor reaches a level where HPa−LP rises to 600 psid (4.17 MPa). Once open, flow through the valve port by-passes the fixed restrictor 38, passing from HPa to HP. Thus at cruise/idle conditions, the valve regulates HPa−LP to around 600 psid (4.17 MPa). The maximum size of the valve port can be set so that at 100% speed, the valve pressure drop HPa−HP is no more than e.g. 50 psid (0.34 MPa).

The fuel control system can provide the following advantages:

1) It separates HMU and external actuator pressure rise requirements. The HMU 35 can operate at a constant low minimum system pressure rise (250 paid-1.72 MPa) providing benefits in terms of hydromechanical control stability (lower gains), constant metering valve 45 slew rates and reduced metering valve fail safe rates at low flow conditions. The pressure rise available to move the external actuators can be increased without adversely affecting the HMU, providing an increased actuator force margin/slew capability, and allowing smaller actuators and servo-valves to be used.

2) The reduced value of (HP−LP) at start conditions is a predictable function of restrictor size and pump speed. It alleviates pump bearing problems (the pumps no longer have to operate at high pressure and low speed) and reduces pump/HMU leakages (more of the pump flow at low speed conditions is available for lighting the engine).

3) It reduces the potential for cavitation in the HMU 35. For example, cavitation across the metering ports of the combining spill valve 37 is less likely when the port pressure drop is reduced.

4) Relative to the arrangement proposed in U.S. Pat. No. 6,176,076, the minimum system pressure rise (HPa−LP) available to move the actuators 44 can be much less sensitive to off-take flows. In particular, because the pressure drop across the fixed restrictor 38 is directly related to pump delivery flow (and hence pump speed) rather than spill flow, the reduction in (HPa−LP) during actuator transients is lower. If a restrictor were to be placed in a pump spill return line (as U.S. Pat. No. 6,176,076), at some low spill flow conditions, movement of the actuators would result in the spill flow reducing to almost zero with a consequent loss of the pressure rise available to drive the actuators. However, in the present invention, part of the small pump delivery flow always passes to the burners so even when part of the delivery flow is pulled off for actuator control, some of the delivery flow still passes through the restrictor 38 to maintain a high pump pressure rise. Thus there is always some pressure drop across the restrictor 38, even when the actuators 44 are slewed.

5) Additionally, placing a restrictor in a pump spill return line (as U.S. Pat. No. 6,176,076). would be particularly disadvantageous for a twin pump system, The restrictor would have to be placed in the small pump spill return line and be sufficiently small to ensure sufficient pump pressure rise to drive the external actuators at all conditions. At some conditions, this would result in an excessively high pump pressure rise (HP−LP), raising heat input to the fuel and also worsening pump bearing integrity issues.

While the invention has been described in conjunction with the exemplary embodiments described above, many equivalent modifications and variations will be apparent to those skilled in the art when given this disclosure. For example, instead of dual high pressure pumps 33, 34, the system may have a single high pressure pump. As another example, some or all of the flow-washed filter 42, the restrictor 38, the non-return valve 39, and the pressure limiting valve 40 can be located in the HMU 35 rather than in the pump unit 31. Accordingly, the exemplary embodiments of the invention set forth above are considered to be illustrative and not limiting. Various changes to the described embodiments may be made without departing from the spirit and scope of the invention.

The invention claimed is:

1. An engine fuel control system including:
a pump arrangement;
a supply line for a supply of fuel to a fuel metering valve which controls a flow of fuel to burners of an engine, in use the fuel being delivered at a first high pressure to the supply line by the pump arrangement which receives fuel at a low pressure;
a restrictor located in the supply line for passage of the fuel delivered by the pump arrangement therethrough, the restrictor being configured such that fuel exiting the restrictor for onward supply to the fuel metering valve is at a second high pressure which is lower than the first high pressure; and
a pressure limiting valve which is actuated when a pressure difference between the first high pressure and the low pressure reaches a predetermined level to open a flow path for fuel on the supply line to by-pass the restrictor, thereby limiting the pressure difference such that the first high pressure and the low pressure act in opposite directions on the valve.

2. An engine fuel control system according to claim 1, wherein the restrictor is a fixed restrictor.

3. An engine fuel control system according to claim 1 further including an off-take line which extends from a junction with the supply line, the off-take line supplying fuel at the first high pressure to one or more fuel-pressure operated auxiliary engine devices via one or more control devices.

4. An engine fuel control system according to claim 3 further including a filter at said junction for filtering the fuel supplied through the off-take line.

5. An engine fuel control system according to claim 1, wherein the pump arrangement is a single pump.

6. An engine fuel control system according to claim 1, wherein the pump arrangement comprises a small displacement pump and a large displacement pump, the small displacement pump delivering the fuel at the first high pressure to the supply line.

7. An engine fuel control system according to claim 1 further including a low pressure source from which the pump arrangement receives the fuel at the low pressure.

8. An engine fuel control system according to claim 1 further including the fuel metering valve which controls the flow of the fuel to the burners of the engine, the fuel metering valve being supplied with the fuel by the supply line.

9. A gas turbine engine having the engine fuel control system according to claim 1.

* * * * *